United States Patent [19]

De Gruijter

[11] Patent Number: 4,790,570
[45] Date of Patent: Dec. 13, 1988

[54] ELECTRICALLY INSULATED JOINT FOR METAL PIPES

[75] Inventor: Wilhelmus A. E. M. De Gruijter, Zwijndrecht, Belgium

[73] Assignee: Angli Holding B.V., Rotterdam, Netherlands

[21] Appl. No.: 51,955

[22] Filed: May 13, 1987

[30] Foreign Application Priority Data

May 14, 1986 [NL] Netherlands .......................... 8601212

[51] Int. Cl.⁴ .............................................. F16L 21/00
[52] U.S. Cl. ......................................... 285/54; 285/351
[58] Field of Search .................... 285/54, 53, 52, 51, 285/50, 48, 351; 277/235 R

[56] References Cited

U.S. PATENT DOCUMENTS

| 495,513 | 4/1893 | Pierce | 285/52 |
|---|---|---|---|
| 2,210,833 | 8/1940 | Clough | 277/235 X |
| 3,432,186 | 3/1969 | Braun | 285/53 |
| 3,612,578 | 10/1971 | Bagnulo | 285/50 |
| 3,612,579 | 10/1971 | Groves | 285/50 |
| 3,937,496 | 2/1976 | Zahid | 285/52 |
| 4,453,899 | 6/1984 | Hiraga et al. | 277/235 X |

FOREIGN PATENT DOCUMENTS

| 1253529 | 11/1967 | Fed. Rep. of Germany | 285/52 |
|---|---|---|---|
| 2245311 | 4/1974 | Fed. Rep. of Germany | 285/54 |
| 2610996 | 9/1977 | Fed. Rep. of Germany | 285/54 |

OTHER PUBLICATIONS

Dutch patent application No. 6919056, Jun. 16, 1978, 2 pages.
"Prochind" leaflet-4 pages.
"Evolution of Monolithic Insulating Joints", from the *Pipe Line Industry* magazine, Nov. 1977, 2 pages.

Primary Examiner—Thomas F. Callaghan
Attorney, Agent, or Firm—Michael J. Striker

[57] ABSTRACT

An electrically insulated joint for metal piping having two receiving elements each having an opposing surface and defining a passage therebetween, at least one of the opposing surfaces having a non-recessed portion and a recessed portion that has an outer diameter smaller than an outer diameter of the non-recessed portion; an insulating ring having an outer diameter and being at least partially disposed against the recessed portion; an elastic sealing ring; and at least one leg disposed against the recessed portion to make the insulating ring impermeable to gas to thereby prevent high pressure build-up. The insulating ring is composed of a metal ring and one leg extending radially from the metal ring so that the insulating ring has an outermost diameter, and insulation material of high compression strength lining the insulated ring entirely. The elastic sealing ring has an inner diameter in a non-compressed state greater than the outermost diameter of the insulating ring. The insulating ring and the elastic sealing ring are compressed between the opposing surfaces. The one leg has an inner surface facing the elastic sealing ring and lying substantially in one common plane with the non-recessed portion.

15 Claims, 2 Drawing Sheets

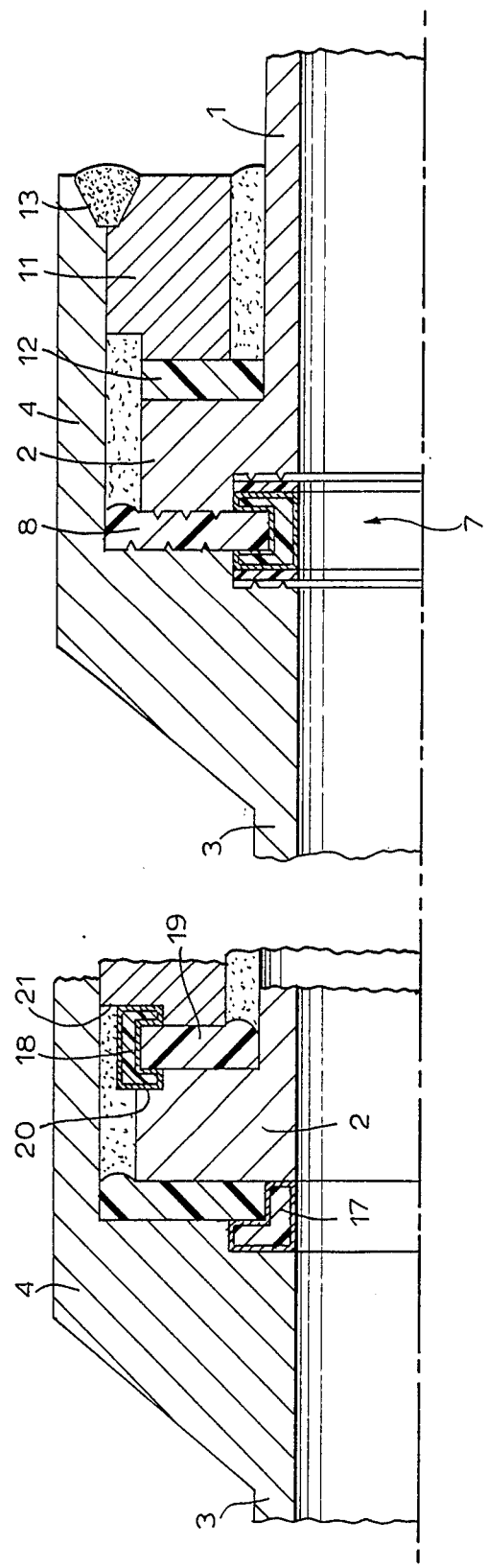

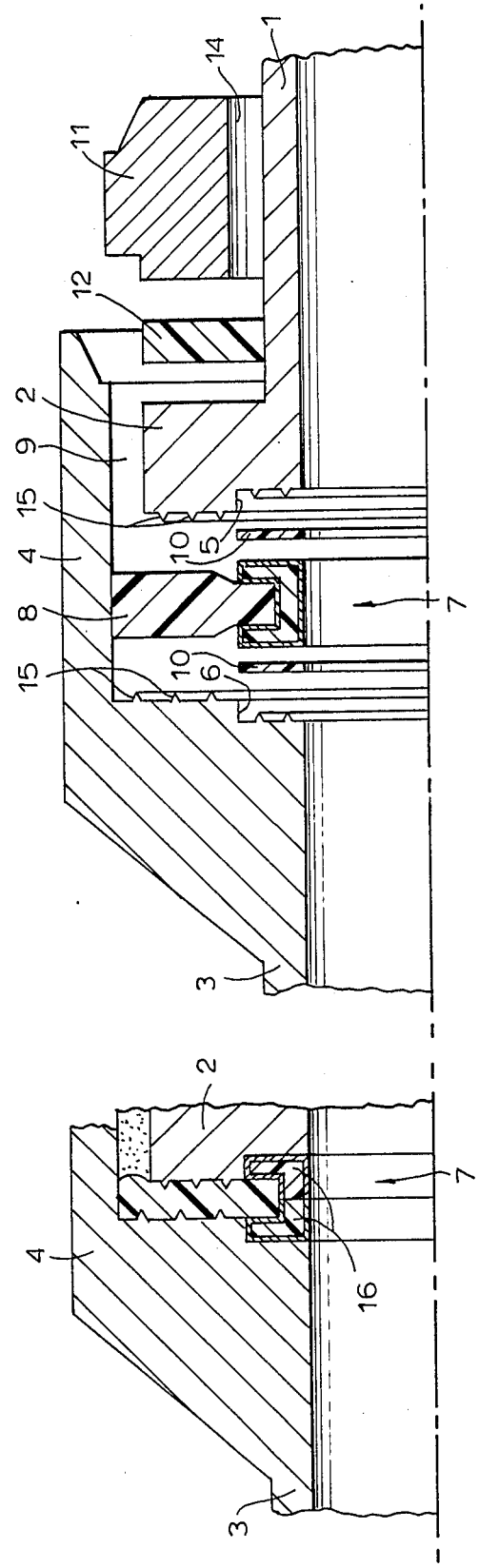

ELECTRICALLY INSULATED JOINT FOR METAL PIPES

BACKGROUND OF THE INVENTION

The invention relates to an electrically insulated joint for metal pipes, comprising a metal receiving element including a bell and a metal insert element including a flange, wherein between the opposed surfaces of the flange and the bell a first insulating ring and an insulating elastic seal ring are compressed and between the rear surface of the flange and a pressure ring a second insulating ring is compressed. The pressure ring abuts the inner wall of the bell and is secured to the bell, wherein in the noncompressed state the inner diameter of the seal ring is smaller than the greatest outer diameter of the first insulating ring. At least in one of the opposed surfaces of the flange and the bell an annular recess is provided, which joins the passage of the respective element and of which the outer diameter is smaller than the outer diameter of the flange and in which the first insulating ring at least partially is received.

Such an electrically insulated joint is known from Dutch patent application No. 6819056. Though this joint represents a considerable improvement over the previously used electrically insulated joints, this joint still shows some disadvantages, which are mainly due to the fact that the insulating rings are composed of an insulating material of high compression strength. Such insulating material is more or less permeable for gas and liquid and upon getting old becomes brittle, scales and slowly but surely collapses under the mechanical and hydraulic stresses to which the insulated joint is subjected. The known joint, in particular does not withstand explosion tests. In the pipe lines including such joints, a relatively high pressure is present in normal operation, which may suddenly drop. The known electrically insulated joint thereby becomes defective in that the first insulating ring forcefully is pressed toward the interior of the joint.

SUMMARY OF THE INVENTION

The invention has the object of providing an electrically insulated joint of the above-mentioned kind, wherein this disadvantage is avoided while retaining the favorable properties of the known joint.

The joint of the invention is characterized in that the first insulating ring consists of a metal ring which in section has at least one radially extending leg disposed in the respective recess, which ring is entirely lined with an insulating material which has a high compression strength and adheres to metal, wherein the inner surface of the (each) leg substantially lies in one plane with the associated surface in which the respective recess is disposed.

In this matter it is obtained that gas can no longer penetrate into the first insulating ring so that when the operating pressure in the joint drops, there no longer exists a danger of explosion.

In keeping with this object, and others which will become apparent later hereafter, one aspect of the invention resides in an electrically insulated joint for metal piping comprising two receiving elements each having an opposing surface and defining a passage therebetween, at least one of said opposing surfaces having a non-recessed portion and a recessed portion that has an outer diameter smaller than an outer diameter of the non-recessed portion; an insulating ring having an outer diameter and being at least partially disposed against the said recessed portion; an elastic sealing ring; and means for making the insulating ring impermeable to gas to thereby prevent high pressure build-up and including at least one leg disposed against the recessed portion. The insulating ring is composed of a metal ring and the one leg extending radially from the metal ring so that the insulating ring has an outermost diameter, and insulation material of high compression strength lining the insulating ring entirely, the elastic sealing ring has an inner diameter in a non-compressed state smaller than the outermost diameter, of the insulating ring. The insulating ring and the elastic sealing ring are compressed between the opposing surfaces. The one leg has an inner surface facing the elastic sealing ring and lying substantially in one common plane with the non-recessed portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The invention will hereinafter be explained by way of the drawing in which some embodiments are shown.

BRIEF DESCRIPTION OF THE DRAWINGS

FIG. 1 is a partially shown axial section of a first embodiment of the electrically insulated joint of the invention in the mounted state.

FIG. 2 is a partially shown axial section of the electrically insulated joint of FIG. 1 in a separated state.

FIG. 3 is a partially shown axial section of a second embodiment of the electrically insulated joint of the invention in the mounted state.

FIG. 4 is a partially shown axial section of a third embodiment of the electrically insulated joint of the invention in the mounted state.

DESCRIPTION OF THE PREFERRED EMBODIMENTS

In FIGS. 1 and 2 there is shown an electrically insulated joint in the mounted state and separated state, respectively. The joint comprises a tubular part 1 which has a flange 2 and which as an insert element is coupled to a metal tubular part 3 as a receiving element having a bell 4. In the opposed surfaces of the flange 2 and the bell 4 recesses 5 and 6 are disposed, of which the outer diameter is smaller than the outer diameter of the flange 2.

Between the opposed surfaces of the flange 2 and the bell 4 a first insulating ring 7 and an insulating elastic seal ring 8 are compressed. The insulating ring 7 consists of a metal ring, which in section is C-shaped and is entirely lined with a strongly adhering insulating material of high compression strength, which material has a good resistance against water, gas, oil and chemical components and high temperatures. Suitable materials for example are epoxy resins, nylon, Teflon and the like. In the non-compressed state the inner diameter of the seal ring 8 is smaller than the greatest outer diameter of the insulating ring 7, so that the inner end of the seal ring 8 is clamped between both radially outwardly extending legs of the C-shaped insulating ring 7.

The legs of the C-shaped insulating ring 7 in the mounted state are received in the recesses 5 and 6, wherein the inner surfaces of these legs substantially lie in one plane with the associated surface of the flange 2 and the bell 4, respectively. The axial thickness of the seal ring 8 is sufficiently greater than the axial distance between the inner surfaces of the legs of the C-shaped insulating ring 7 to guarantee in the compressed state between the opposed surfaces of the flange 2 and the bell 4 a complete sealing of the joint. The outer diameter of the seal ring 8 is about equal to the inner diameter of the bell 4, so that in the mounted state the seal ring 8 is pressed against the inner wall of the bell 4 and bulges upwardly in the space 9 between the outer side of the flange 2 and the inner wall of the bell 4.

As shown in FIGS. 1 and 2, annular sealing gaskets 10 can be disposed at both sides of the insulating ring 7. These sealing gaskets 10 in section may be L-shaped, wherein the axial leg is in contact with the seal ring 8. The annular gaskets 10 preferably are made of the synthetic material like nylon or TEFLON, so that they resist a high electrical tension.

Between the rear surface of the flange 2 and a pressure ring 11 a second insulating ring 12 is compressed, which consists of an insulating material of high compression strength. The pressure ring 11 is forcefully pressed in the bell 4, so that the insulating ring 7, the seal ring 8 and the insulating ring 12 are clamped between the respective opposed surfaces. The pressure ring 11 is secured by a weld 13 or in another manner known per se.

The space 9 between the bell 4 and the flange 2 and a space 14 between the pressure ring 11 and the outer surface of the tube end 1 are filled with a synthetic resin material.

The opposed surfaces of the flange 2 and the bell 4 in the embodiment shown in FIGS. 1 and 2 are provided with annular projecting ridges 15 as are the surfaces of the recesses 5 and 6. Instead of projecting ridges, also grooves may be disposed in these surfaces.

As shown in FIG. 3 the C-shaped insulating rings 7 may be built from two halves 16 of L-shaped section, each of which is lined with the insulating material.

It is also possible to dispose only one L-shaped insulating ring 16 between the flange 2 and the bell 4, and in that case only in the bell 4 or in the flange 2 a recess is disposed.

When the joint is subjected to very high pressures and/or temperatures, the insulating ring 12 may be replaced by an insulating ring 18 which corresponds with the insulating ring 7 and has an insulating elastic seal ring 19. The insulating ring 18 consists of metal and is lined with the same insulating material as the insulating ring 7. The insulating ring 18 is C-shaped in section and the legs are directed radially inwardly. Between both legs of the insulating ring 18, the outer end of the seal ring 19 is clamped, since the outer diameter of the seal ring 19 is greater than the smallest inner diameter of the insulating ring 18. In the opposed surfaces of the flange 2 and the pressure ring 11 suitable recesses 20 and 21, respectively, are disposed for receiving the legs of the insulating ring 18, wherein the inner surfaces of the legs of the insulating ring 18 substantially lie in one plane with the associated surfaces of the flange 2 and the pressure ring 11, respectively. Of course, also the insulating ring 18 may be built from two halves of L-shaped section or may be replaced by one L-shaped insulating ring.

The insulating rings 7, 18 used with the joint of the invention have the great advantage that they are not permeable for gas so that no high pressure can build up in the insulating ring. The joint of the invention therefore is perfectly explosion proof. Furthermore the joint of the invention has a long life, since the used insulating rings are more resistant against a high pressure.

The invention is not limited to the previously described embodiments, which may be modified in various manners within the scope of the invention.

It will be understood that each of the elements described above, or two or more together, may also find a useful application in other types of electrically insulated joints for metal pipes, differing from the types described above.

While the invention has been illustrated and described as embodied in an electrically insulated joint for metal pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. An electrically insulated joint for metal piping, comprising:

two receiving elements each having an opposing surface facing each other, at least one of said opposing surfaces having a projecting portion and a recessed portion recessed relative to said projecting portion, said recessed portion having an outer diameter smaller than an outer diameter of said projecting portion;

an insulating ring composed of a metallic element having an outer surface and an insulation member of high compression strength lining the whole outer surface of and adhering to said metallic element so as to make said insulating ring impermeable to gas and liquid, said metallic element including a metal ring and at least one leg integral with and extending radially from said metal ring so as to provide said insulating ring with an outermost diameter, said recessed portion extending in a radial direction along all of said leg;

an elastic sealing ring having an inner diameter in a non-compressed state smaller than said outermost diameter of said insulating ring, said leg having an inner surface facing said elastic sealing ring, said inner surface lying substantially in one common plane with said projecting portion, said insulation member on said leg being disposed against said recessed portion, said two receiving elements being pressed together so as to compress said insulating ring and said elastic sealing ring between said opposing surfaces and thereby insulate said opposing surfaces of said two receiving elements; and means for pressing said two receiving elements together.

2. The joint as defined in claim 1, wherein one of said two receiving elements has a flange portion formed on said at least one opposing surface, said flange portion also having a rear surface behind said one opposing surface, the other of said two receiving surfaces having an inner wall facing said one receiving element; further comprising:
a pressure ring abutting said inner wall and secured to said other receiving element; and
a second insulating ring compressed between said pressure ring and said rear surface of said flange portion.

3. The joint as defined in claim 2, further comprising:
a first synthetic resin body, said elastic sealing ring having an extended portion extending beyond an outer edge of said flange portion, said first synthetic resin body being arranged to extend axially adjacent from said extended portion of said elastic sealing ring and between said flange portion and said other receiving element; and
a second synthetic resin body, said second insulating ring having an extended portion extending beyond an inner edge of said pressure ring, said second synthetic resin body being arranged to extend axially adjacent from said extended portion of said second insulating ring and between said pressure ring and said one receiving element.

4. The joint as defined in claim 1, wherein said recessed portion is continuously annular.

5. The joint as defined in claim 1 wherein the other of said opposing surfaces has a second recessed portion corresponding to the first-mentioned recessed portion; further comprising:
another of said at least one leg extending radially from said metal ring of said insulating ring so that said insulating ring has a C-shaped cross-section, said elastic sealing ring having an inner end clamped between both of said legs.

6. The joint as defined in claim 6, wherein said insulating ring is formed with two halves so that said C-shaped cross-section is a composite of two L-shaped cross-sections, each of said halves being lined with said insulating lining.

7. The joint as defined in claim 1; further comprising:
means for resisting electrical tension and including an insulating sealing gasket disposed between said recessed portion and said at least one leg.

8. The joint as defined in claim 1, wherein one of said opposing surfaces has at least one annular groove.

9. The joint as defined in claim 1, wherein one of said opposing surfaces has at least one upstanding ridge.

10. The joint as defined in claim 1, wherein one of said receiving elements has a flange portion formed on said at least one opposing surface, said flange portion also having a rear surface facing away from said one opposing surface, a pressure ring having a front surface facing said rear surface of said flange portion so that said front and rear surfaces constitute second opposing surfaces, one of said second opposing surfaces having a second projecting portion and a second recessed portion recessed relative to said projecting portion, the other of said two receiving elements without the flange portion having an inner wall facing said receiving element with the flange portion; further comprising:
said pressure ring abutting and secured to said inner wall;
an second insulating ring composed of a second metallic element having an outer surface and a second insulating member of high compression strength lining the whole outer surface of and adhering to said second metallic element so that said second insulating ring is impermeable to gas and liquid, said second metallic element including a second metal ring and at least one second leg integral with said second metal ring, said second leg extending radially inward from said second metal ring so as to provide said second insulating ring with an innermost diameter, said second recessed portion extending in a radial direction along all of said second leg;
a second elastic sealing ring having an outer diameter in a non-compressed state larger than said innermost diameter of said second insulating ring, said second leg having an inner surface facing said second elastic sealing ring and lying substantially in one common plane with said second projecting portion, said second insulation lining on said second leg being disposed against said second recessed portion, said pressure ring and said flange portion being pressed together so as to compress said second insulating ring and said second elastic sealing ring between said second opposing surfaces and thereby insulate said second opposing surfaces; and
means for pressing said pressure ring and said flange portion together.

11. The joint as defined in claim 10, wherein said first and second recessed portions are continuously annular.

12. The joint as defined in claim 10 wherein the other of said second opposing surfaces has a second recessed portion corresponding to the first-mentioned recessed portion of said second opposing surfaces; further comprising:
another second leg extending radially from said second metal ring of said insulating ring so that said second insulating ring has a C-shaped cross-section, said second elastic sealing ring having an inner end clamped between both of said second legs.

13. The joint as defined in claim 12, wherein said second insulating ring is formed with two halves so that said C-shaped cross-section is a composite of two L-shaped cross-sections, each of said halves being lined with said insulation lining.

14. The joint as defined in claim 10; further comprising:
a first synthetic resin body, said first-mentioned elastic sealing ring extending beyond an outer edge of said flange portion so as to constitute an extended portion, said first synthetic resin body being arranged to extend axially adjacent from said extended portion of said first-mentioned elastic sealing ring and between said flange portion and said other receiving element; and
a second synthetic resin body, said second elastic sealing ring extending beyond an inner edge of said pressure ring so as to have a second extended portion, said second synthetic resin body being arranged to extend axially adjacent from said extended portion of said second elastic sealing ring and between said pressure ring and said one receiving element.

15. The joint as defined in claim 1; and further comprising:
the means for pressing said elements together including a pressure member being formed so as to press one of said elements against the other of said elements and being secured to said other element.

* * * * *